United States Patent [19]

Masi

[11] 4,335,773
[45] Jun. 22, 1982

[54] WINDING UP SUNSHADE CURTAIN FOR MOTOR-VEHICLES

[76] Inventor: Lamberto Masi, Via Newton No. 9, Pero, Milan, Italy

[21] Appl. No.: 105,097

[22] Filed: Dec. 19, 1979

[30] Foreign Application Priority Data

Dec. 21, 1978 [IT] Italy ............................... 31143 A/78
Sep. 17, 1979 [IT] Italy ............................... 25776 A/79

[51] Int. Cl.³ ............................................. E06B 9/08
[52] U.S. Cl. ................................. 160/23 R; 160/120; 160/290 R
[58] Field of Search ................... 160/23 R, 23 C, 238, 160/24, 290 R, 237, DIG. 7, DIG. 2, DIG. 3, DIG. 10, 120, 323 R, 264; 296/97 R, 97 C

[56] References Cited
U.S. PATENT DOCUMENTS

| | | | |
|---|---|---|---|
| 1,389,603 | 9/1921 | Sharps et al. | 160/23 R |
| 1,448,016 | 3/1923 | Welshausen | 160/23 R |
| 2,200,481 | 5/1940 | Thexton | 160/264 |
| 2,874,770 | 2/1959 | Rohr et al. | 160/23 R |
| 3,115,927 | 12/1963 | Znamirowski | 160/323 R X |
| 3,183,033 | 5/1965 | Stolbach | 160/23 R |
| 3,363,666 | 1/1968 | Hodgson et al. | 160/23 R |
| 3,445,135 | 5/1969 | Masi | 296/97 C |

*Primary Examiner*—Philip C. Kannan
*Attorney, Agent, or Firm*—Fleit & Jacobson

[57] ABSTRACT

The curtain comprises a sheet of flexible opaque material having a plurality of holes and attached to a winding-up shaft carried by end supports. A semicylindrical casing is parallelly arranged and partially surrounds the winding-up shaft to permit a hand grip element to be rotated, when mounted, from one side to the other of the casing according to requirements.

13 Claims, 9 Drawing Figures

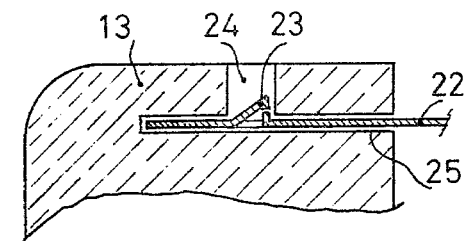
fig. 4
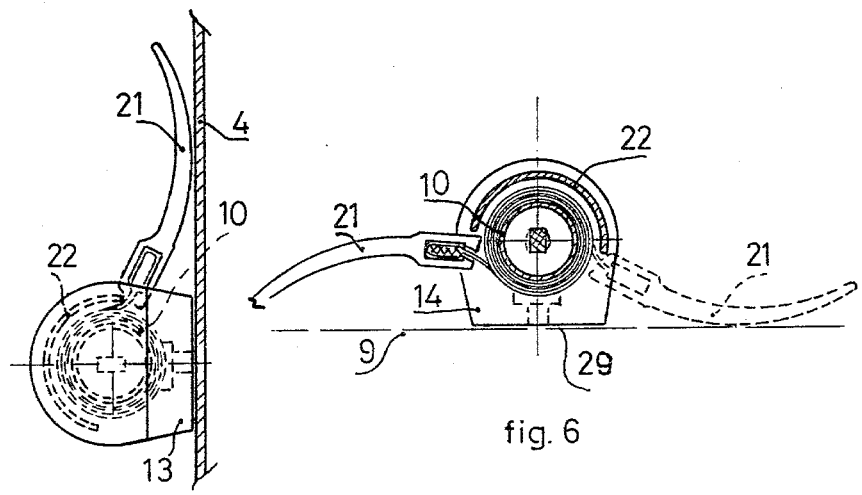
fig. 5
fig. 6
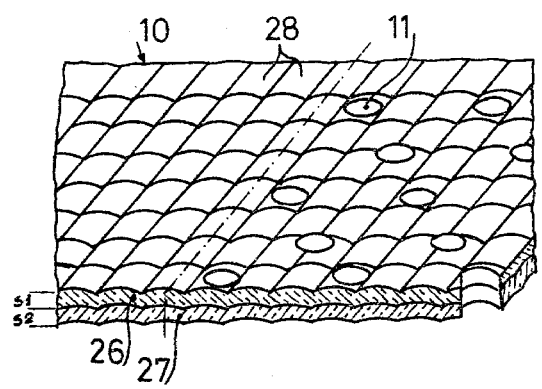
fig 7

WINDING UP SUNSHADE CURTAIN FOR MOTOR-VEHICLES

BACKGROUND OF THE INVENTION

This invention refers to a sunshade curtain for motor-vehicles and, in particular, to a roller type curtain, suitable for mounting along one edge of a side or rear window of said vehicle.

DESCRIPTION OF THE PRIOR ART

Roller type curtains for motor-vehicles are known which comprise a tubular case provided with a longitudinal slit through which it is possible to withdraw a curtain, unwinding it from a shaft, biased by a spring to rotate in the winding up direction of said curtain. In particular, the curtain is composed of a flexible sheet material, the side which should face the interior of the motor-vehicle is dark-coloured to improve visibility, and the opposite side, to face the exterior, is prevalently light-coloured to keep the interior of the motor-vehicle as cool as possible when the vehicle must remain exposed to the sun for a certain length of time.

Since curtains are generally mounted on a vertical plane or surface along the lower edge of a side window or on a mainly horizontal plane corresponding to the rear window of the motor-vehicle, the curtain must be mounted correctly, in such a way that the dark-coloured side always faces the interior of the motor-vehicle.

With the sunshade curtain of known type at present on sale, due to the cylindrical configuration of the casing and the position of the slit for curtain sheet withdrawal, it is not possible to use the same type of curtain for a side or rear window, as this would cause an inverted and therefore incorrect arrangement of the dark and light-coloured sides.

Therefore, in making such curtains, it was necessary, during assembling, to carry out any expedients required to mount the tubular case with the slit suitably oriented in the correct position to withdraw the curtain sheet, according to the mounting position foreseen in the interior of the motor-vehicle. This not only creates greater mounting difficulties and therefore higher costs, but also greater problems as regards the different and numerous stocks required both by the constructors and retailers. Furthermore, due to the structure of the known type of curtains a great deal of time is required and high costs as many assembling operations are involved.

It is also noted that these curtains are composed of a sheet of plastic material, preferably PVC, with mainly smooth surfaces. The smooth nature of these surfaces makes it difficult to unwind and withdraw the curtain sheet, when the latter, wound in the case, remains at length exposed to the sun or to high temperatures. In fact, PVC is a material which softens easily at temperatures of around 50°-60° C.; consequently, due to the biasing force of the winding up spring and to the smooth surfaces in contact, the coils of the curtain sheet have a strong tendency to cling together, hindering, and even impeding, unwinding and withdrawal of the curtain sheet from its case.

SUMMARY OF THE INVENTION

This invention aims to provide a curtain of the abovementioned type, which may be mounted correctly and indifferently on a side or rear window of a motor-vehicle, without the need to modify the curtain structure; the curtain thus becomes practically of universal use with easily imaginable advantages.

A further object of this invention is to provide a curtain of the abovementioned type having a special structure which greatly simplifies assembling operations, completely eliminating the use of screws, rivets, etc.

Yet another object is to provide a curtain which includes a sheet of synthetic flexible plastic material, by means of which it is possible to raise the temperature limit which may be borne by the curtain; this is achieved with extremely simple means and at a relatively low cost, which make it possible for the curtain to remain exposed to the sun and to high temperatures for a certain length of time, without problems.

According to a first aspect of the invention, a sunshade curtain for motor-vehicles has been provided, including a case suitable to be mounted along a window edge, the curtain including a sheet of opaque flexible material provided with a plurality of openings or perforations arranged in predetermined parallel rows, said sheet of flexible material being fastened along an edge to a winding-up shaft connected to a biasing spring which makes this shaft rotate in the winding up direction of the sheet, in which the case is composed of a shaped element with curve profile, parallelly arranged and partially surrounding the winding-up shaft, each end of said case element being provided with snap fitting means which engage a corresponding seat formed in an end supporting element for the case and the abovementioned winding-up shaft. According to another aspect and of this invention, it has been found that, if the nature of one or both the side surfaces of the sheet of material are modified, e.g. by formations of relief parts, it is possible to raise satisfactorily the temperature limit at which the curtain coils cling together; thus greatly reducing the risk of blocking, and therefore damaging, the curtain. The above has been carried out with a sunshade curtain including at least one sheet of opaque flexible material suitable to be wound up on a rotating shaft, in which said sheet of material, on at least one of its side surfaces, is provided with formations of relief parts which have reciprocal dimensions and distances of between 20% and 50% of the thickness of this sheet.

According to a further feature of this invention, the sheet material contains a large number of small-dimensioned openings or holes with pre-established arrangement, the dimensions and distances of the abovementioned relief parts being further comparable to the dimensions of said openings.

BRIEF DESCRIPTION OF THE DRAWINGS

The sunshade curtain according to the invention will be more fully illustrated below, referring to the attached drawings in which:

FIG. 4 shows an enlarged detail of FIG. 3.

FIG. 5 shows the mounting of the curtain on a vertical plane, corresponding to the lower edge of a side window of a motor-vehicle.

FIG. 6 shows the mounting of the curtain on a horizontal plane, near the rear window of a motor-vehicle.

FIG. 7 shows an enlarged detail of a curtain sheet.

DESCRIPTION OF THE PREFERRED EMBODIMENTS

Figure 1:
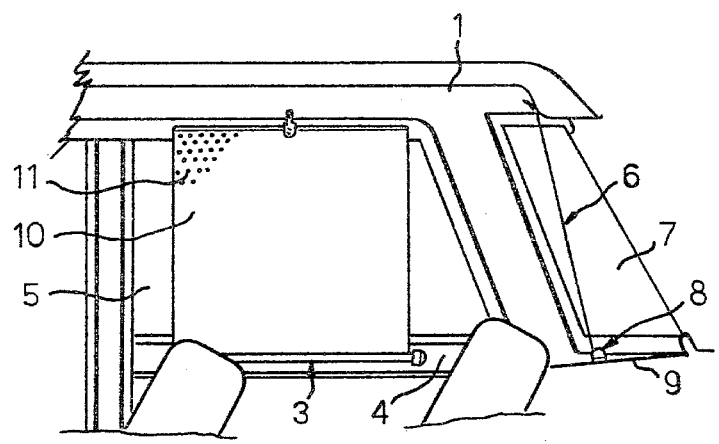
FIG. 1 shows the possible applications of the curtain in the inside of a motor-vehicle.

FIG. 1 shows the inside of a motor-vehicle 1 in which a first sunshade curtain 3 is mounted on a mainly vertical plane or surface 4 parallelly to the lower edge of a side window 5 of motor-vehicle 1; a second sunshade curtain 6 is shown for the rear window 7, with curtain case 8 mounted on a mainly horizontal shelf 9 normally foreseen in the rear of the motor-vehicle.

The curtain, for example, is composed of a sheet 10 in flexible, opaque material, e.g. synthetic plastic material (PVC) or other suitable material, this sheet 10 being provided with a large number of holes or openings 11, in parallel rows, according to a predetermined arrangement. In particular, the holes 11 in a row are formed at regular intervals, but offset half a step with respect to the holes in adjacent rows; therefore, with a hole dimension of between 0.5 and 1.5 mm., for example, and with a step or distance between the centres of two adjacent holes in the same row of between 1.5 and 4 mm. there is perfect visibility through the sheet 10 of opaque material.

Curtain sheet 10 is connected with one end along a winding-up shaft consisting, in the case shown, of a tubular element 12 carried and rotating on end supporting elements 13 and 14 (FIG. 3) by means of special plugs 15 and 16 fitted into the ends of the abovementioned tubular shaft. In particular, each plug 15 and 16 has circular fins with serrated profile which facilitates introduction of the plug into the tube, keeping it firmly in position. Furthermore, one of the shaft plugs, e.g. plug 15, has a pin 17 protruding coaxially to tube 12, which penetrates a hole 18 in the corresponding supporting element 13, on the other hand, the other plug 16 has a passing-through hole for an inside shaft 19, one end of which is connected to the other supporting element 14.

Figure 2:
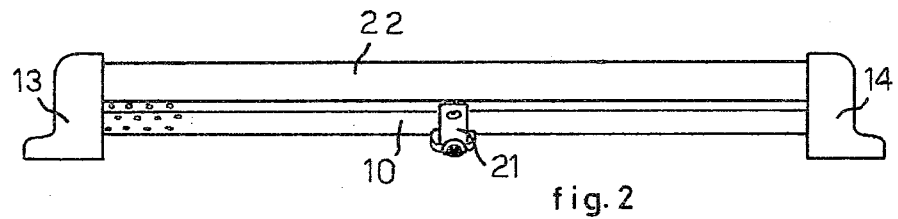
FIG. 2 shows a view of the curtain.
Figure 3:
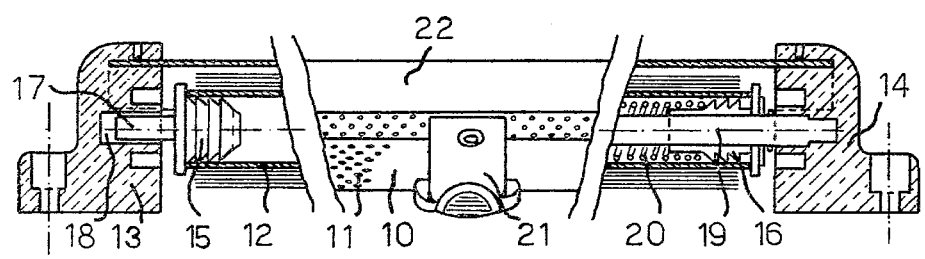
FIG. 3 shows an enlarged longitudinal section of the curtain of FIG. 2.

One side of a helical spring 20 is connected to the inner end of shaft 19 and the other to the tubular shaft 12, for example through plug 16. In this way, giving spring 20 a suitable preload during assembling, this spring 20 acts on tubular shaft 12 in the direction in which flexible sheet 10 is wound. A small tongue 21, connected to the opposite edge of sheet 10, is used as a grip element when unwinding the curtain, and engages a hooking element (not shown) fastened to the upper edge of the window. As shown in FIGS. 2, 3 and 6, when wound on shaft 12, curtain sheet 10 is protected by a casing which surrounds only a part of said shaft. In particular, it will be noted that the case in the example shown is composed of a tile-shaped or semicircular shaped element 22, secured between supporting elements 13 and 14 parallel to winding-up shaft 12.

As FIG. 4 shows in detail, each end of casing element 22 snap fits into a respective seat 25 of supporting elements 13 and 14, thus avoiding the use of screws, rivets etc. during curtain assembling. In the example shown, this snap coupling means includes the formation of a protrusion or tab 23, slightly behind each end of case element 22, which protrudes into suitable recess 24, communicating with the arched seat 25 for the end of case 22 in the relevant supporting elements 13 and 14.

This curtain structure, as already mentioned, makes assembling extremely easy as this may be carried out by hand without the need for special tools.

The curtain structure shown also permits a standardized construction. To understand this, reference is made to FIGS. 1, 5 and 6 of the attached drawings.

FIG. 5 shows an enlarged end view of the curtain applied to the side window 5 of FIG. 1. This curtain is in the condition in which it is normally supplied by the manufacturer, i.e. in the wound-up condition of FIG. 5, the left side of the drawing corresponds to the interior of the motor-vehicle. Therefore, on the basis of what is stated above, this side of the sheet must be dark-coloured to allow perfect visibility through same. When it is necessary to apply the curtain to rear window 7, since it is always necessary to keep the dark side of the sheet facing the interior, the curtain must be positioned as shown in FIG. 6.

This is achieved by simply pulling and turning the position of small tongue 21 around 180° so that half a coil is unwound, thus enabling to withdraw the sheet always in an upward direction, with the dark-coloured side of the sheet facing left, i.e. the interior of the motor-vehicle. This rotation is possible thanks to the special configuration and arrangement of case 22 which surrounds only one side of the shaft. Rotation may be carried out at the moment of curtain mounting on the motor-vehicle and therefore the same curtain may be mounted and sold independently of its particular use on the motor-vehicle, which is undoubtedly an advantage as it permits curtain construction to be standardized as described above.

FIGS. 5 and 6 show a further feature suitable for any type of curtain according to the invention; in fact, from these figures it is noted that the casing 22 is angularly displaced, with respect to a plane which is parallel to the resting surfaces of the supporting elements 13 and 14, in direction opposite to that in which the curtain sheet is wound up. In particular, the angular displacement of the case is such that the plane passing through the longitudinal edges of the case forms an angle of approximately 10° to 35°, preferably between 25° and 30°, with a plane passing through the axis of the winding-up shaft 12 and parallel to the resting surfaces 29 of the supports. In this way curtain unwinding is further facilitated regardless of the position of the casing.

FIG. 7 shows the features of the material used for the curtain sheet according to the invention. From the example in FIG. 7, it is noted that sheet 10 is composed of two superimposed layers 26 and 27 in the same or different material, e.g. PVC, having a thickness S1 and S2 between 0.12 and 0.25 mm., according to the mechanical resistance and flexibility requirement for the sheet of material. The two-layer formation of the sheet material is advantageous since it makes it possible to obtain easily two differently coloured faces or side surfaces, e.g. one layer could be obtained with dark-coloured material to facilitate visibility from the interior of the motor-vehicle and the other with light-coloured material to reflect the solar heat from the exterior.

In particular, it is noted that one side of the sheet 10 in FIG. 7 shows formations of relief parts composed, as in this particular case, of a large number of small, evenly distributed longitudinal beads 28 with transversal dimensions and reciprocal distances comparable to the dimensions of openings 11 and to the thickness S1, S2 of sheet 10; these dimensions may, for example, be between 20% and 50% of the entire thickness of the abovementioned sheet of material 10.

Relief parts 28 on the surfaces of sheet material 10 may have any configuration or arrangement and may be obtained by embossing or by any other suitable method. For example, in the case of the sheet in FIG. 7 formed by coupling two layers of material 16 and 27, embossing step i.e. formation of the surface embossed relief parts could be carried out on a layer of material before coupling, but preferably during the same coupling step between one layer and another, using a rotary press which has a correspondingly relief-embossed design on its cylinders.

It is useful that the parts or relief formations 28 have reciprocal distances, measured in the direction of the rows of openings or holes 11, two or three times less, for example, than the interaxis or distance between the centres of adjacent holes, and that the step at which relief parts 28 succeed one another differs from a submultiple of the step or interaxis of said holes. This is important to avoid repeatedly overlapping holes 11 and embossed parts 28 to guarantee that a certain amount of air always passes between the curtain coils when wound, which contributes to avoiding them clinging together. The principle on which the curtain material is based is as follows: when the curtain is fully wound up, as shown in the section of FIG. 6, its coils overlap and only partially touch one another, as the embossed surface on one side of a coil comes into contact with the unembossed surface on the opposite side of the adjacent coil. Therefore, the limited number of contact points and the air pockets which form between coils, prevent the abovementioned surfaces clinging together even when there is a rise in temperature.

Some tests have been carried out on a curtain sample produced with traditional material, i.e. unembossed or without relief parts, and a curtain sample produced with embossed material, as per this invention. The curtains were placed in an oven and kept at a high temperature for sufficient time to simulate their exposure to a strong solar heat; the results are shown in the following table, which indicates the maximum temperature and maximum stay in oven:

|  | Max temperature °C. | Max time Hours |
|---|---|---|
| Traditional material | 75° C. | 1 |
| Embossed material | 100° C. | 6 |

The tested curtains were in PVC material with a thickness of 0.30 mm. and, in the case of the material according to the invention, there was an embossment depth of around 40% of the thickness of the material.

The tests made have demonstrated that the curtain produced with an embossed sheet material gives the above results, with a much longer duration and a higher temperature reached, without compromising the functioning of the curtain. These features are particularly appreciable in the application of roller type curtains on motor-vehicles, when the latter are parked in squares or in the open, remaining at a standstill for long periods before being sold or used.

Figure 8:
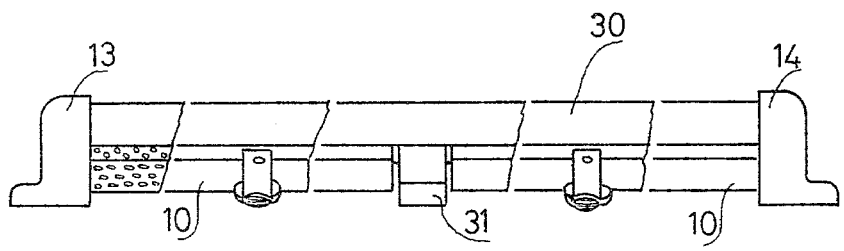
FIG. 8 is a view of two curtains aligned in a single casing.
Figure 9:
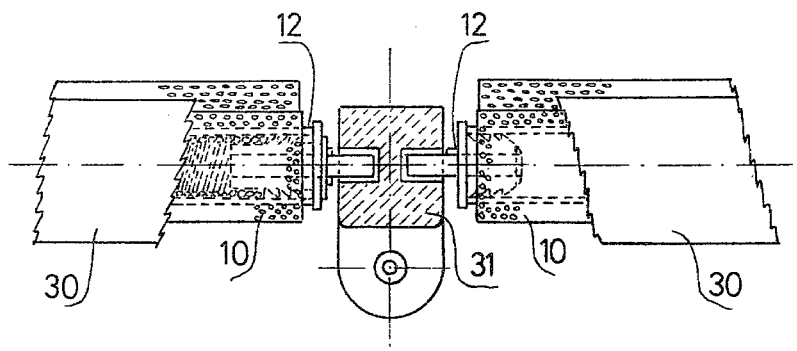
FIG. 9 is an enlarged detail of FIG. 8.

Finally, FIGS. 8 and 9 show two roller type curtains 10 arranged in axial alignment in a single case 30 of suitable length, said case 30 being provided with end supports 13 and 14 and an intermediate support 31; this intermediate support 31 is fixed, by means of a screw, to the case and is suitable to support the aligned ends of the two tubular winding-up shafts 12 of the curtains. As shown in FIG. 3, the intermediate support 31 protrudes laterally from the case, impeding bending.

What is claimed is:

1. In a sunshade curtain for motor-vehicles comprising a case mounted along one edge of a window, the curtain comprising a sheet of flexible opaque material provided with a dark colored inner face and with openings arranged in predetermined parallel rows, one edge of said sheet being fastened to a winding-up shaft carried by end supporting elements and connected to a spring biasing this shaft to rotate in the winding-up direction of said sheet, the improvement in which the case is composed of an arcuate profiled element, parallelly arranged and partially surrounding said winding-up shaft, said profiled element being provided at both ends with snap fitting means which engage a corresponding seat formed in a respective one of the end supporting elements for said case and winding shaft, said sheet of flexible material having a grip element fastened to the edge opposite the edge fastened to the winding-up shaft, said grip element being turnable through an arc not covered by the case, by partially unwinding said sheet, said grip element being pullable in a first direction when adjacent one edge of the case to unwind said sheet and being pullable in the same direction when adjacent the other edge of the case to unwind the sheet while maintaining the dark colored face on the inside of the motor-vehicle.

2. Curtain, according to claim 1, in which said case is composed of a semicircular profiled element.

3. Curtain, according to claim 1, comprising a tubular winding-up shaft for the sheet, a first and second plug forced into the ends of said tubular shaft, one of the plugs having a protruding pin lodged in a hole of one of the end supporting elements, the other plug having a passing-through hole for a second shaft fastened to the other end supporting element, a helical spring surrounding said second shaft and having ends fastened to said second shaft and to the other plug.

4. Curtain, according to claim 1, in which the case is angularly displaced in the opposite direction to that in which the curtain is wound up, with respect to a plane parallel to resting surfaces of the supporting elements.

5. Curtain, according to claim 4, in which the case is angularly displaced by an angle of approximately 10° to 35°.

6. Curtain, according to claim 4, in which the case is angularly disposed by an angle of approximately 25° to 30°.

7. Curtain, according to claim 1, in which the case has a length more than double the width of a curtain and that two roller type curtains are coaxially aligned in the same case.

8. Curtain, according to claim 7, including an intermediate supporting element for the case and for facing ends of the curtain winding-up shafts.

9. Curtain, according to claim 1, in which at least one side of said flexible sheet of material includes a formation of relief parts having widths and heights of between 20% and 50% of the thickness of the sheet material.

10. Curtain, according to claim 9, in which said relief parts have widths comparable with the widths of the openings.

11. Curtain, according to claim 10, in which the distance between like edges of two adjacent relief parts is less than the interaxis distance between two adjacent openings in the same row.

12. Curtain, according to claim 10, in which said sheet material comprises a first layer of dark-coloured synthetic plastic material and a second layer of light-coloured synthetic plastic material superimposed on the first layer, and in which relief parts are embossed at the same time as the two layers of materials are coupled.

13. Curtain, according to claim 10, in which the relief parts are arranged in rows, the distance between openings in a row being different from the distance between adjacent rows of openings.

* * * * *